(12) United States Patent
Edvardsson

(10) Patent No.: US 7,586,435 B1
(45) Date of Patent: Sep. 8, 2009

(54) RADAR LEVEL GAUGE SYSTEM USING A WAVEGUIDING STRUCTURE WITH PERIODICALLY ARRANGED REFERENCE IMPEDANCE TRANSITIONS

(75) Inventor: Olov Edvardsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 12/122,016

(22) Filed: May 16, 2008

(51) Int. Cl.
*G01S 13/08* (2006.01)

(52) U.S. Cl. .................. 342/124; 342/118; 342/165; 342/173; 342/195; 73/290 R; 324/600; 324/629

(58) Field of Classification Search .............. 342/188, 342/124, 173–175, 165, 195; 73/290; 324/600, 324/629, 637–646
See application file for complete search history.

(56) References Cited

U.S. PATENT DOCUMENTS

| | | | |
|---|---|---|---|
| 5,249,463 A | 10/1993 | Willson et al. ............. 73/290 |
| 5,898,308 A * | 4/1999 | Champion ................ 324/643 |
| 6,184,818 B1 | 2/2001 | Meinel .................... 342/124 |
| 6,867,729 B2 | 3/2005 | Berry et al. ............... 342/124 |
| 7,525,476 B1 * | 4/2009 | Delin et al. ............... 342/124 |
| 2007/0085729 A1 * | 4/2007 | Edvardsson .............. 342/124 |

FOREIGN PATENT DOCUMENTS

DE 44 19 462 A1 12/1995

\* cited by examiner

Primary Examiner—Thomas H Tarcza
Assistant Examiner—Timothy A Brainard
(74) Attorney, Agent, or Firm—Westman, Champlin & Kelly, P.A.

(57) ABSTRACT

A radar level gauge system, for determining a filling level of a product contained in a tank, said radar level gauge system comprising:
a transceiver for generating, transmitting and receiving electromagnetic signals within a frequency range;
a waveguiding structure arranged to extend into said product contained in the tank and to guide a transmitted signal from said transceiver towards a surface of said product and to guide echo signals resulting from reflections at impedance transitions encountered by the transmitted electromagnetic signals, including a surface echo signal resulting from reflection at said surface, back to said transceiver;
a plurality of reference impedance transitions provided substantially periodically along said waveguiding structure with a distance between adjacent reference impedance transitions that is selected such that signals resulting from reflection of said transmitted signal at each of said reference impedance transitions combine to form a reference signal having a frequency within said frequency range; and
processing circuitry connected to said transceiver for determining a propagation velocity of said electromagnetic signals in a medium inside the tank above said surface of the product based on said frequency of said reference signal and said distance between adjacent reference impedance transitions, and determining said filling level based on said surface echo signal and said propagation velocity.

34 Claims, 5 Drawing Sheets

RADAR LEVEL GAUGE SYSTEM USING A WAVEGUIDING STRUCTURE WITH PERIODICALLY ARRANGED REFERENCE IMPEDANCE TRANSITIONS

TECHNICAL FIELD OF THE INVENTION

The present invention relates to a radar level gauge system using a waveguiding structure, such as a probe or a still pipe, for determining a filling level of a product contained in a tank.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a waveguiding structure, such as a probe or a still pipe. The waveguiding structure is generally arranged to extend vertically from the top towards the bottom of the tank. The waveguiding structure may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the phase difference between a transmitted frequency-modulated signal and its reflection at the surface caused by the time difference. The latter type of systems are generally referred to as being of the FMCW (Frequency Modulated Continuous Wave) type.

The propagation velocity, knowledge of which is required to determine the filling level based on the time-of-flight, is determined by various factors, such as the configuration of the waveguiding structure and environmental conditions inside the tank. Such environmental conditions, for example, include the composition of the atmosphere above the surface of the product contained in the tank.

For radar level gauge systems adapted for very high accuracy (such as 0.1% or less) the tank atmosphere will influence the propagation velocity. As an example, the propagation velocity in normal air is around 0.03% slower than in vacuum, while pressurized hydrocarbon gases have a higher influence with propane at 10 bar as one example of high influence (1%).

U.S. Pat. No. 6,867,729 and U.S. Pat. No. 5,249,463 disclose different systems designed to compensate for varying vapor concentrations in the atmosphere above the surface of the product in the tank.

The level measuring system disclosed in U.S. Pat. No. 6,867,729 normally operates at a relatively low gain to determine a material level of material contained in a tank, and periodically operates at a relatively high gain to determine a distance to a target marker provided along the probe above an expected sensing region of the probe. The determined distance to the target marker is used to compensate the determined material level for properties of vapor above the material level.

The level measuring system for measuring a water level disclosed in U.S. Pat. No. 5,249,463 comprises a probe provided with a pair of spaced reference discontinuities above the maximum level of the water. The difference between the measured and the known distance between the reference discontinuities is used to provide a measurement of the water level, that is independent of changes in the dielectric constant of the vapor above it.

Although enabling a determination of the propagation velocity in the tank atmosphere, reference reflectors such as those disclosed in U.S. Pat. No. 6,867,729 and U.S. Pat. No. 5,249,463 will create some disturbance in their vicinity with an influence on the measurement accuracy of the radar level gauge system. Typically, the calibration echoes are either too strong and disturb the filling level measurement, or too weak and are disturbed by the surface echo.

SUMMARY OF THE INVENTION

In view of the above-mentioned and other drawbacks of the prior art, a general object of the present invention is to provide an improved radar level gauge system and method, and in particular a radar level gauge system and method capable of higher accuracy filling level determination.

According to a first aspect of the present invention, these and other objects are achieved through a radar level gauge system, for determining a filling level of a product contained in a tank, the radar level gauge system comprising: a transceiver for generating, transmitting and receiving electromagnetic signals within a frequency range; a waveguiding structure arranged to extend into the product contained in the tank and to guide a transmitted signal from the transceiver towards a surface of the product and to guide echo signals resulting from reflections at impedance transitions encountered by the transmitted electromagnetic signals, including a surface echo signal resulting from reflection at the surface, back to the transceiver; a plurality of reference impedance transitions provided substantially periodically along the waveguiding structure with a distance between adjacent reference impedance transitions that is selected such that signals resulting from reflection of the transmitted signal at each of the reference impedance transitions combine to form a reference signal having a frequency within the frequency range; and processing circuitry connected to the transceiver for determining a propagation velocity of the electromagnetic signals in a medium inside the tank above the surface of the product based on a frequency of the reference signal and the distance between adjacent reference impedance transitions, and determining the filling level based on the surface echo signal and the propagation velocity.

According to a second aspect of the present invention, the above-mentions and other objects are achieved through a waveguiding structure for use in a radar level gauge system for guiding transmitted electromagnetic signals within a frequency range towards and into a material comprised in a tank and for guiding echo signals resulting from reflections at impedance transitions encountered by the electromagnetic signals back along the waveguiding structure, the waveguiding structure comprising a plurality of reference impedance transitions provided substantially periodically along the waveguiding structure with a distance between adjacent reference impedance transitions that is selected such that signals resulting from reflection of a transmitted signal at each of the reference impedance transitions combine to form a reference signal having a frequency within the frequency range, thereby enabling determination of a propagation velocity of the electromagnetic signals in a medium inside the tank based on the frequency of the reference signal and the distance between adjacent reference impedance transitions.

The tank may be any container or vessel capable of containing a product, and may be metallic, or partly or completely non-metallic, open, semi-open, or closed.

The "transceiver" may be one functional unit capable of transmitting and receiving electromagnetic signals, or may be a system comprising separate transmitter and receiver units.

The waveguiding structure may be any structure suitable for guiding the electromagnetic signals transmitted by the transceiver. Examples of suitable waveguiding structures include single-line probes, twin-line probes, coaxial probes, so-called still pipes etc. The waveguiding structure may be essentially rigid or flexible and may be made from metal, such as stainless steel, plastic, such as PTFE, or a combination thereof.

The present invention is based on the realization that a good determination of the propagation velocity in the medium inside the tank above the product to be gauged can be achieved with practically no influence on the accuracy of the filling level determination carried out by the radar level gauge system by providing a waveguiding structure having a plurality of substantially periodically arranged reference impedance transitions that each result in a very weak echo signal, but together result in a strong reflected signal in a narrow frequency range only, this frequency range being determined by the distance between adjacent reference impedance transitions.

Hereby, a strong, easily determined reference signal indicative of the propagation velocity of the electromagnetic signals in the medium above the surface of the product, for example the tank atmosphere, can be achieved without running the risk of disturbing surface echo signals. Hence, the trade-off of prior art systems between a reference echo signal that is too weak to be reliably determined and one that is so strong that it disturbs the filling level determination does not have to be made.

To achieve this effect, that a plurality of weak echo signals can combine to form a strong echo signal for a given frequency, the reflecting structures may be arranged with a distance between adjacent reference impedance transitions that corresponds to a number of half wavelengths for the given frequency within the frequency range according to the following relation:

$$d = n\frac{\lambda}{2}; n = 1, 2, 3, \ldots ,$$

where d is the distance between adjacent reflecting structures and $\lambda$ is the wavelength, in the medium through which the electromagnetic signals propagate, corresponding to the frequency of the reference signal.

It should, in this context, be noted that the waveguiding structure having reference impedance transitions provided thereto can be viewed as a type of "periodic structure" or "Electromagnetic Band Gap structure" that is well known from general microwave literature.

In general, an Electromagnetic Band Gap (EBG) structure is a transmission line that can be of any type but has a mechanical periodicity along its length (with the period length—in this case the distance between adjacent reference impedance transitions—being one basic parameter) such as a single wire line which has thicker parts in a periodic fashion. Such general EBG structures are, for example, referred to in the text book "Foundations for microwave engineering (IEEE Press 2001)" by Robert Collins. Typical for the transmission line built as a periodic structure (or EBG structure) is that the physical periodicity is transferred to a periodic behavior of the transmission of an electromagnetic wave as a function of the frequency. At low frequencies (where the length of the mechanical period is short as compared to the wavelength corresponding to the used frequency) the transmission line behaves as a continuous line (with average thickness etc.) but at frequencies where the period is comparable to or bigger than the wavelength, the transmission line has a very characteristic behavior such as interleaving pass-bands and stop-bands. Regardless of the specific details of the periodic structure there will in any case be a drastic difference between the transmission/reflection properties for frequencies within pass-bands and stop-bands. It is this difference that is used in the various aspects of the present invention to gain information regarding the conditions on and around the line (notably the propagation velocity). For a periodic structure suitable for implementing the invention, a transmission line/waveguiding structure with periodic and identical reference impedance transitions is preferred and the reflection from a single such reference impedance transition is typically very small or even impossible to detect while the total reflection is very large, but occurs in specific frequency bands only. Due to the electrical loss along the line (existing for any waveguiding structure especially if the waveguiding structure is made of a poor conductor such as stainless steel) the stop-bands are not perfect stop-bands but rather frequency bands with a peculiar behavior such as a strong reflection over a very narrow frequency band.

To ensure that the filling level determination is not disturbed by echo signals resulting from reflection at the reference impedance transitions, each reference impedance transition may be configured to reflect an echo signal having a power that is lower than −20 dB in relation to a power of the transmitted signal. Even more advantageous results are achievable by configuring each reference impedance transition to provide as low reflection as −30 to −50 dB in relation to the power of the transmitted signal.

Hereby, the range of the radar level gauge system can be kept at a satisfactory level, even for a long waveguiding structure (a deep tank), because only a small amount of the transmitted power is reflected by each reference impedance transition and, moreover, the loss in power is confined to a small frequency range, which may be selected to be outside the frequency range that is normally used to determine the surface echo signal. The frequency range at which the loss in power should occur can be selected by selecting the distance between adjacent reference impedance transitions.

For some types of waveguiding structures, notably probes made of poor electrical conductors such as stainless steel, the power loss due to "normal" guiding along the waveguiding structure limits the distance between adjacent reference impedance transitions for yielding a useful result. For example, the distance between adjacent reference impedance transitions may be less than 1 meter, whereby a distinct reference signal can be achieved.

To make the reference signal easier to distinguish and to increase the accuracy of the determination of the propagation velocity, it is advantageous if the reference signal represents a relatively narrow peak or pulse. This can at least partly be achieved by arranging the reference impedance transitions in such a way that a standard deviation of the spacing between adjacent reference impedance transitions, for the plurality of reference impedance transitions, is below 1 percent of an average of the distance between adjacent reference impedance transitions.

In principle, increasing the number of reference impedance transitions provided along the waveguiding structure will improve the quality of the reference signal, and hence improve the quality of the determination of the propagations velocity. To this end, it is expected that the provision of at least 10 reference impedance transitions along the waveguiding structure will enable determination of the propagation velocity with an at least satisfactory accuracy. It is also expected that increasing the number of reference impedance transitions will further improve the determination of the propagation velocity.

According to one embodiment, the waveguiding structure may be a single line probe. Each of the reference impedance transitions may be formed by a reflecting structure attached to the single-line probe. Such reflective structures may, for example, be formed as conductive or dielectric cylindrical shells that are attached to the probe. Alternatively, the reference impedance transitions may be realized by forming suitable recesses in the probe.

According to another embodiment, the waveguiding structure may be a coaxial waveguide having an inner conductor and an outer conductor. In this case, each of the reflecting structures may advantageously be formed by a spacing structure arranged to space apart said inner and outer conductors.

Such a spacing structure may advantageously be made of a dielectric, such as a plastic material or a ceramic. Various such suitable structures are presently used to space apart the inner and outer conductors of coaxial waveguides.

According to a further embodiment, the waveguiding structure may be a twin-line probe comprising a pair of conductors. In this case, each of the reference impedance transition may advantageously be formed by a spacer element for spacing apart the conductors.

According to yet another embodiment, the waveguiding structure may be a still pipe, and each reference impedance transition may then advantageously be formed by at least one recess in the wall of the still pipe. Such a recess may for example be a blind hole or a through-going hole.

Moreover, the transceiver included in the radar level gauge system according to the various embodiments of the present invention may be adapted to transmit a substantially continuous signal with a frequency that varies over time across the frequency range. Such a radar level gauge system is generally referred to as an FMCW-system. It should be noted that the frequency may vary continuously or step-wise depending on application.

In such a system, the reference impedance transitions may advantageously be arranged in such a way that the reference signal has a frequency which is close to an end point of the frequency range. For example, the reference signal may be outside a central range corresponding to, say, 80% of the frequency range. Hereby, the ability to distinguish the reference signal may be improved.

According to another embodiment, the transceiver included in the radar level gauge system according to the various embodiments of the present invention may be adapted to transmit electromagnetic pulses. The pulses may be so-called DC-pulses or may be modulated on a carrier within the frequency range.

When the filling level is determined in a pulsed radar level gauge system, the reflected echo signals are typically evaluated in the time domain. By adding an evaluation in the frequency domain, however, the frequency of the reference signal, and hence the propagation velocity can be determined. From the time domain signal containing very weak periodical echoes, Fourier transformation or similar will reveal strong spikes in the frequency domain for the frequency of the reference signal (the sum of the echo signals from the reference impedance transitions).

According to a third aspect of the present invention, the above-mentioned and other objects are achieved through a method for determining a filling level of a product contained in a tank, the method comprising: generating and transmitting electromagnetic signals within a frequency range; propagating transmitted electromagnetic signals along a waveguiding structure extending towards and into the product contained in the tank, the waveguiding structure comprising a plurality of reference impedance transitions provided substantially periodically along the waveguiding structure with a distance between adjacent reference impedance transitions that is selected such that signals resulting from reflection of a transmitted electromagnetic signal at each of the reference impedance transitions combine to form a reference signal having a frequency within the frequency range; receiving echo signals resulting from reflections at impedance transitions encountered by the transmitted electromagnetic signals, including the reference signal and a surface echo signal resulting from reflection at the surface of the product; determining a propagation velocity of the electromagnetic signals in a medium inside the tank above the surface of the product based on the frequency of the reference signal and the distance between adjacent reference impedance transitions; and determining the filling level based on the surface echo signal and the propagation velocity.

Advantageously, generating and transmitting electromagnetic signals may include frequency-modulating the electromagnetic signals. This is, for example, the case for so-called frequency-modulated radar level gauge (RLG) systems, such as FMCW-systems and for so-called pulsed radar level gauge systems in which the pulses are modulated on a carrier.

In the frequency-modulated RLG-system case, the step of frequency-modulating the electromagnetic signals may advantageously comprise the steps of: in a first frequency sweep, sweeping a frequency of the electromagnetic signals across a first frequency range, excluding the frequency of the reference signal, at a first sweep rate; and in a second frequency sweep, sweeping a frequency of the electromagnetic signals across a second frequency range, including the frequency of the reference signal, at a second sweep rate lower than the first sweep rate.

Although the exact frequency of the reference signal is typically unknown, a narrow frequency range including the frequency of the reference signal can generally be determined based on the known distance between adjacent reference impedance transitions and approximate knowledge of the electrical properties of the medium above the product inside the tank.

This narrow frequency range, the second frequency range, may be swept at a low sweep rate to enable accurate determination of the frequency of the reference signal, and thereby also of the propagation velocity.

For example, the second sweep rate may be lower than 50 percent of the first sweep rate.

As indicated above, the second frequency range may advantageously be smaller than the first frequency range, such as smaller than 50 percent, or even smaller than 10 percent of the first frequency range.

It should, in this context, be mentioned that the first frequency range may typically be around 10 percent of the center frequency of the transmitted (and received) signals.

Moreover, the method for frequency-modulated RLG-systems may further comprise the steps of: determining intermediate frequency signals by combining the echo signals and a signal indicative of the transmitted electromagnetic signal; analyzing intermediate frequency signals corresponding to the second frequency sweep to determine the frequency of the reference signal; and analyzing intermediate frequency signals corresponding to the first frequency sweep to determine a frequency shift indicative of the filling level.

Advantageously, furthermore, the intermediate frequency signals corresponding to the second frequency sweep may be analyzed in a time domain; and the intermediate frequency signals corresponding to the first frequency sweep may be analyzed in a frequency domain.

The intermediate frequency signal is sometimes also referred to as a beat signal.

Further features and effects associated with the method according to the present aspect of the invention are largely analogous to those described above for the first and second aspects of the present invention.

BRIEF DESCRIPTION OF THE DRAWINGS

These and other aspects of the present invention will now be described in more detail, with reference to the appended drawings showing a currently preferred embodiment of the invention, wherein:

FIG. 1b is a schematic illustration of the measurement electronics unit comprised in the radar level gauge system in FIG. 1a;

FIG. 1c is a schematic cross-section view of a portion of the probe comprised in the radar level gauge system in FIG. 1a;

FIG. 2a schematically illustrates an exemplary frequency modulated signal transmitted by the transceiver in an embodiment of the radar level gauge in FIG. 1a;

DETAILED DESCRIPTION OF A PREFERRED EMBODIMENT OF THE INVENTION

In the present detailed description, various embodiments of the radar level gauge system according to the present invention are mainly discussed with reference to a guided wave radar (GWR) level gauge system of the FMCW (Frequency Modulated Continuous Wave) type utilizing a single line probe. It should be noted that this by no means limits the scope of the present invention, which is equally applicable to radar level gauge systems including various other kinds of waveguiding structures, such as twin-line probes, coaxial probes, still pipes, etc. Furthermore, the present invention is not limited to radar level gauge systems of the FMCW-type, but may equally well be implemented in pulsed radar level gauge systems, in which the received echo pulses can be analyzed to determine the frequency of the reference signal and hence the propagation velocity in the medium inside the tank above the surface of the product contained therein.

Figure 1A:
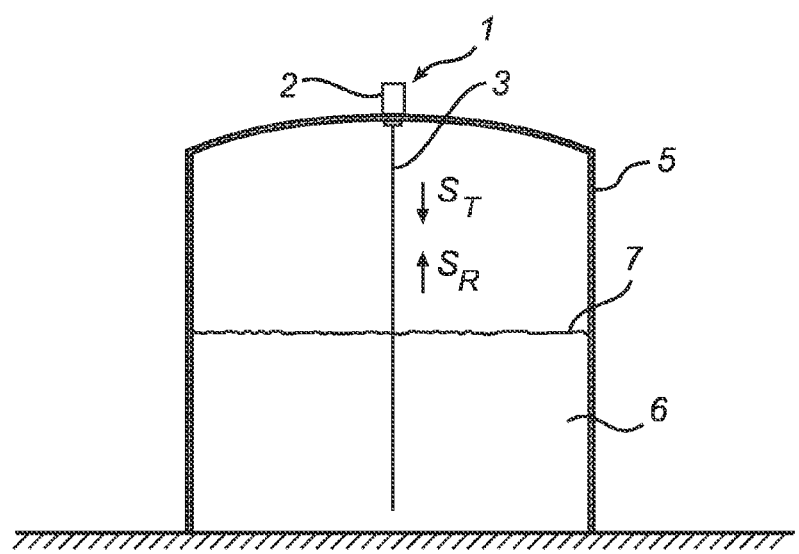
FIG. 1a schematically illustrates a radar level gauge system according to an embodiment of the present invention installed in an exemplary tank.

FIG. 1a schematically illustrates a radar level gauge system 1 according to an embodiment of the present invention, comprising a measurement electronics unit 2, and a probe 3. The radar level gauge system 1 is provided on a tank 5, which is partly filled with a product 6 to be gauged. By analyzing transmitted signals $S_T$ being guided by the probe 3 towards the surface 7 of the product 6, and reflected signals $S_R$ traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be determined in a similar manner.

Figure 1B:
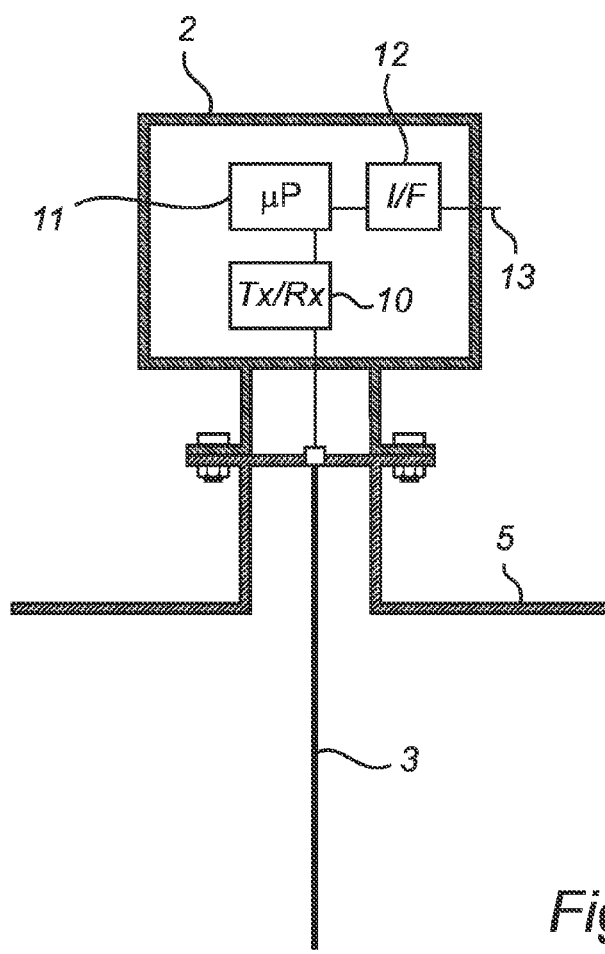

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is, furthermore, connectable to external communication lines 13 for analog and/or digital communication via an interface 12. Moreover, although not shown in FIG. 1b, the radar level gauge system 1 is typically connectable to an external power source, or may be powered through the external communication lines 13. Alternatively, the radar level gauge system 1 may be configured to communicate wirelessly.

Figure 1C:
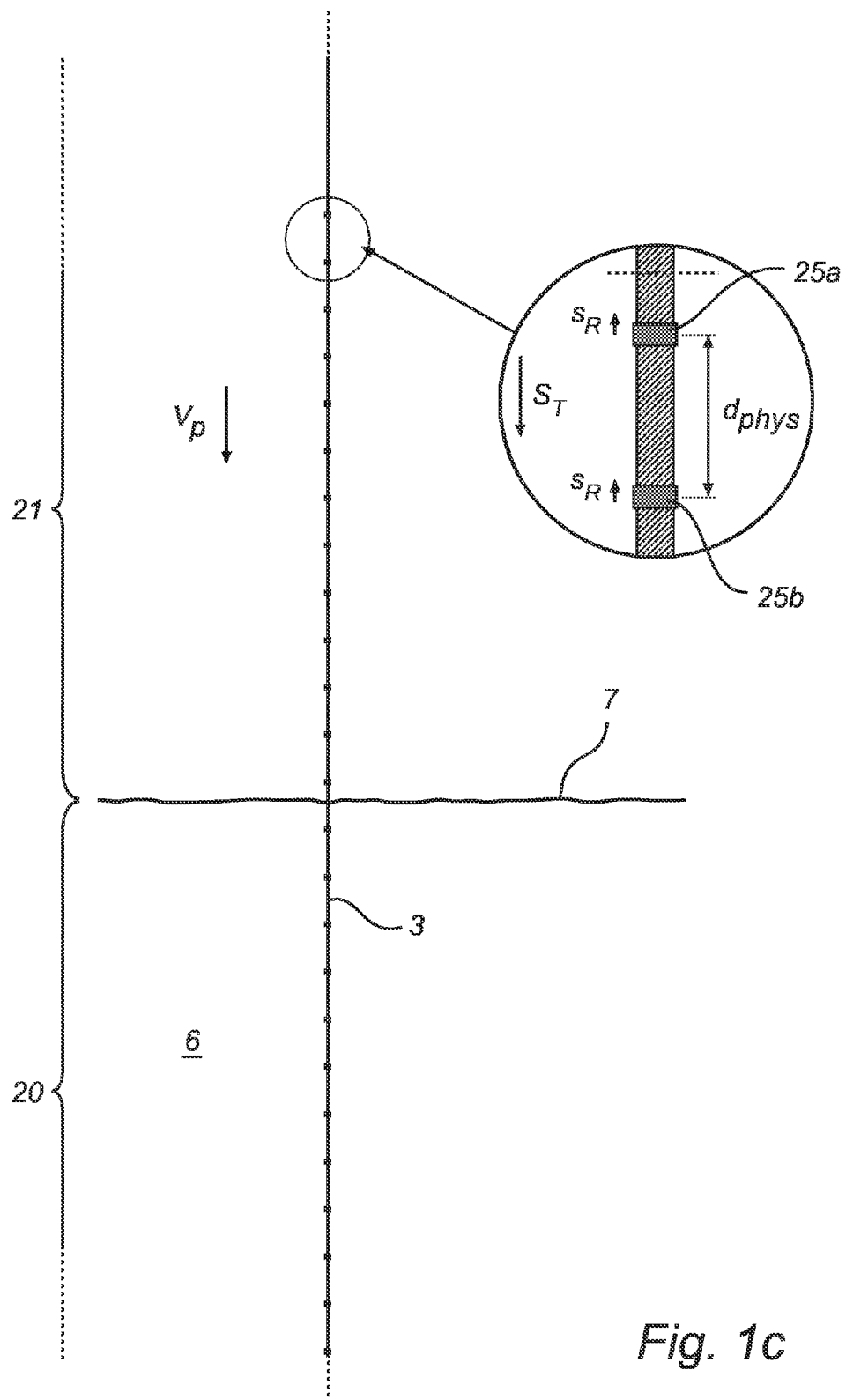

In FIG. 1c, a segment of the probe 3 comprising a submerged portion 20 and an unsubmerged portion 21 is shown. As can be seen in FIG. 1c, a plurality of reference impedance transitions, in the form of reflecting structures 25a-b (only two reflecting structures are indicated by reference numerals for the sake of clarity of drawing) are provided substantially periodically along the probe 3. As is schematically illustrated in FIG. 1c, each reflecting structure 25a-b reflects an echo signal $S_R$, having a power which is a very small fraction, say −30 to −60 dB of the power of the transmitted signal $S_T$. By arranging the reflecting structures in a large number, as indicated in FIG. 1c, and with a suitable distance between adjacent reflecting structures, the echo signals $S_R$ reflected by each reflecting structure combine to a clearly distinguishable echo signal $S_R$ for a given frequency that depends on the electrical distance between adjacent reflecting structures. By determining the frequency, the electrical distance between adjacent reflecting structures 25a-b can be deduced. Knowing the physical distance between adjacent reflecting structures 25a-b, the propagation velocity can then be determined. Using the thus determined propagation velocity, the filling level of the product 6 contained in the tank 5 can be determined with high accuracy.

To illustrate the proposed periodic structure constituted by the waveguiding structure with the substantially periodically provided reference impedance transitions, we may for example consider a 6 mm stainless steel wire 3 used as a surface waveguide (single line probe) in the frequency range 0.5-1 GHz. Attaching to the wire 3 one metal cylindrical shell 25a-b every 300 mm we will get the special periodic structure behavior for every 500 MHz. If the input impedance (around 300 ohm) is matched, a narrow band reflection will occur every 500 MHz where half a wavelength is 300 mm. If each of the cylindrical shells 25a-b has a wall thickness of 1 mm, the impedance of the single line probe 3 will locally decrease by around 1.5% at each cylindrical shell. Given a length of the cylindrical shell of 5-10 mm (or up to 20-30 mm), the power of the reference signal resulting from the combined reflection from all cylindrical shells 25a-b would have a power of about 10-20 dB below the power of the transmitted signal $S_T$, which is in the same range as a reflection from the surface a hydrocarbon liquid, but only within a frequency band of 0.1-0.2% of the total frequency range. The reflection $S_R$ from a single cylindrical shell 25a-b would be about −50 to −60 dB of the power of the transmitted signal $S_T$ and, depending on the sensitivity of the system, such a weak reflection may or may not be measurable.

The operation of embodiments of the radar level gauge system 1 to determine the propagation velocity $v_{prop}$ inside the tank 5 will now be explained for an FMCW-system with reference to FIGS. 2a-b.

Figure 2A:
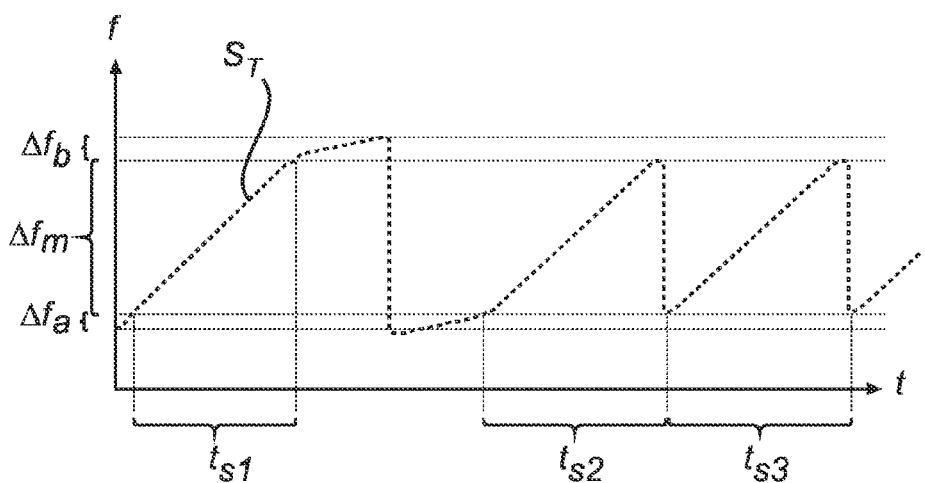

FIG. 2a schematically shows an exemplary frequency modulated signal transmitted by the transceiver 10 in an FMCW-type radar level gauge system comprising a periodic structure in the form of the single line probe 3 provided with reference impedance transitions 25a-b, as described above in connection with FIG. 1c. To enable determination of the filling level of the product 6 contained in the tank 5, the transceiver 10 sweeps the frequency of the transmitted signal over a measurement frequency range $\Delta f_m$. In FIG. 2a, three such frequency sweep periods $t_{s1}$, $t_{s2}$ and $t_{s3}$ are shown.

Between the first $t_{s1}$ and the second $t_{s2}$ of these frequency sweep periods, slower frequency sweeps are performed covering relatively narrow frequency bands $\Delta f_a$ and $\Delta f_b$ outside the measurement frequency range $\Delta f_m$.

In the present exemplary radar level gauge system, the distance between adjacent reference impedance transitions 25a-b has been selected such that interference peaks occur for a frequency in the lower frequency band $\Delta f_a$ and for a frequency in the higher frequency band $\Delta f_b$.

In a radar level gauge system of the FMCW-type, the received electromagnetic signal is mixed with (a copy of) the transmitted electromagnetic signal to yield an intermediate frequency signal (sometimes also referred to as beat signal). This intermediate signal $S_{IF}$, which is schematically illustrated in FIG. 2b, is then used to determine the filling level of the product 6 contained in the tank 6.

Figure 2B:
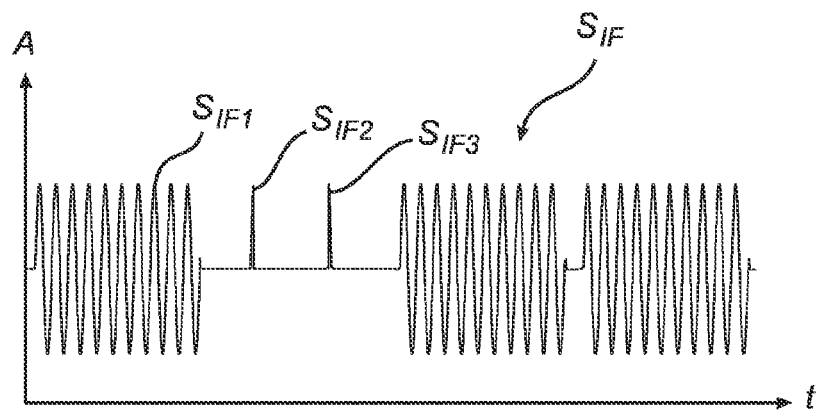
FIG. 2b schematically illustrates exemplary intermediate signals resulting from mixing the signal in FIG. 2a with the received signal resulting from reflection of the transmitted signal.

With reference to FIG. 2b, it can be seen that the intermediate frequency signal $S_{IF}$ comprises an essentially sinusoidal part $S_{IF1}$, a low frequency peak $S_{IF2}$ and a high frequency peak $S_{IF3}$. By studying the essentially sinusoidal part in the frequency domain (for example by applying FFT to the time-domain signal of FIG. 2b) the frequency shift between the transmitted signal $S_T$ and the surface echo signal can be obtained, from which the electrical distance to the surface 7 of the product 6 in the tank 5 can be deduced.

Furthermore, by determining at which frequencies $f_1$ and $f_2$, the low and high frequency peaks $S_{IF1}$ and $S_{IF2}$, respectively are located, the propagation velocity $v_{prop}$ in the tank atmosphere can be determined using the relation:

$$v_{prop} = 2f_1 \cdot d_{physical}, \text{ or } v_{prop} = f_2 \cdot d_{physical}, \text{ where}$$

$v_{prop}$ is the propagation velocity of electromagnetic signals in the medium above the surface 7 of the product 6 in the tank 5;

$d_{physical}$ is the physical distance between adjacent reference impedance transitions 25a-b;

$f_1$ is the frequency corresponding to the first wavelength at which interference between the echo signals reflected at the reference impedance transitions 25a-b occurs; and $f_2$ is the frequency corresponding to the second wavelength at which interference between the echo signals reflected at the reference impedance transitions 25a-b occurs.

The reflecting structures that are arranged along the waveguiding structure may be provided in various forms depending on the type of waveguiding structure that is included in the radar level gauge system 1.

Below, a few exemplary waveguiding structures provided with reflecting structures will be described with reference to FIGS. 3a-d.

FIG. 3a again schematically illustrates a portion of the single lead probe 3 being provided with reference impedance transitions in the form of pipe portions 25a-b.

Figure 3A:
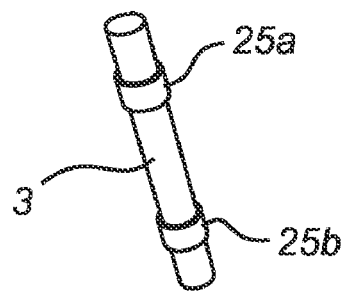
FIGS. 3a-d schematically illustrate different exemplary waveguiding structures with reflecting structures.
Figure 3B:
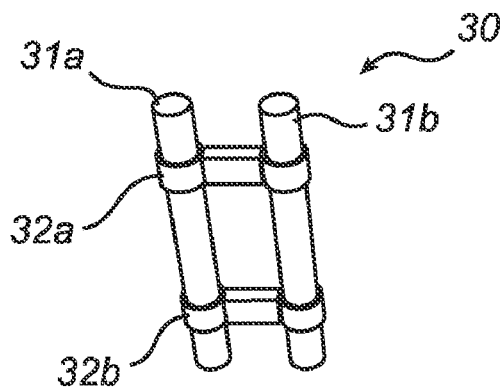

FIG. 3b schematically illustrates a portion of a twin line probe 30 comprising first 31a and second 31b probe conductors. The twin line probe 30 is provided with reference impedance transitions in the form of spacing structures 32a-b spacing the first 31a and second 31b probe conductors apart.

Figure 3C:
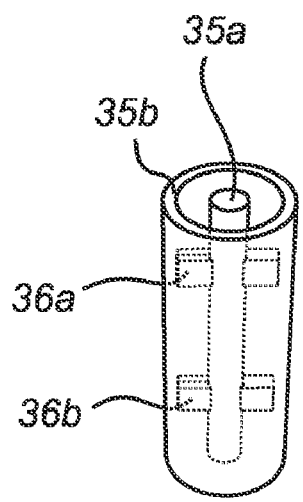

FIG. 3c schematically illustrates a portion of a coaxial probe 34 comprising an inner 35a and an outer 35b conductor. The coaxial probe 34 is provided with reference impedance transitions in the form of spacing structures 36a-b spacing the inner 35a and outer 35b conductors apart.

Figure 3D:
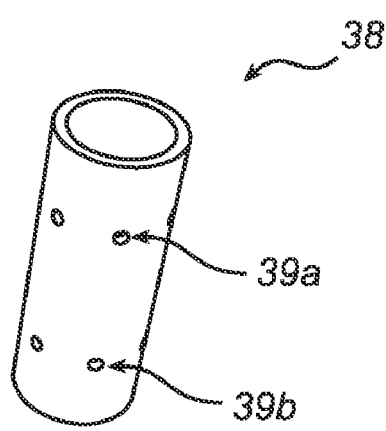

Finally, FIG. 3d schematically illustrates a portion of a still pipe 38 that is provided with reference impedance transitions in the form of recesses 39a-b.

Figure 4:
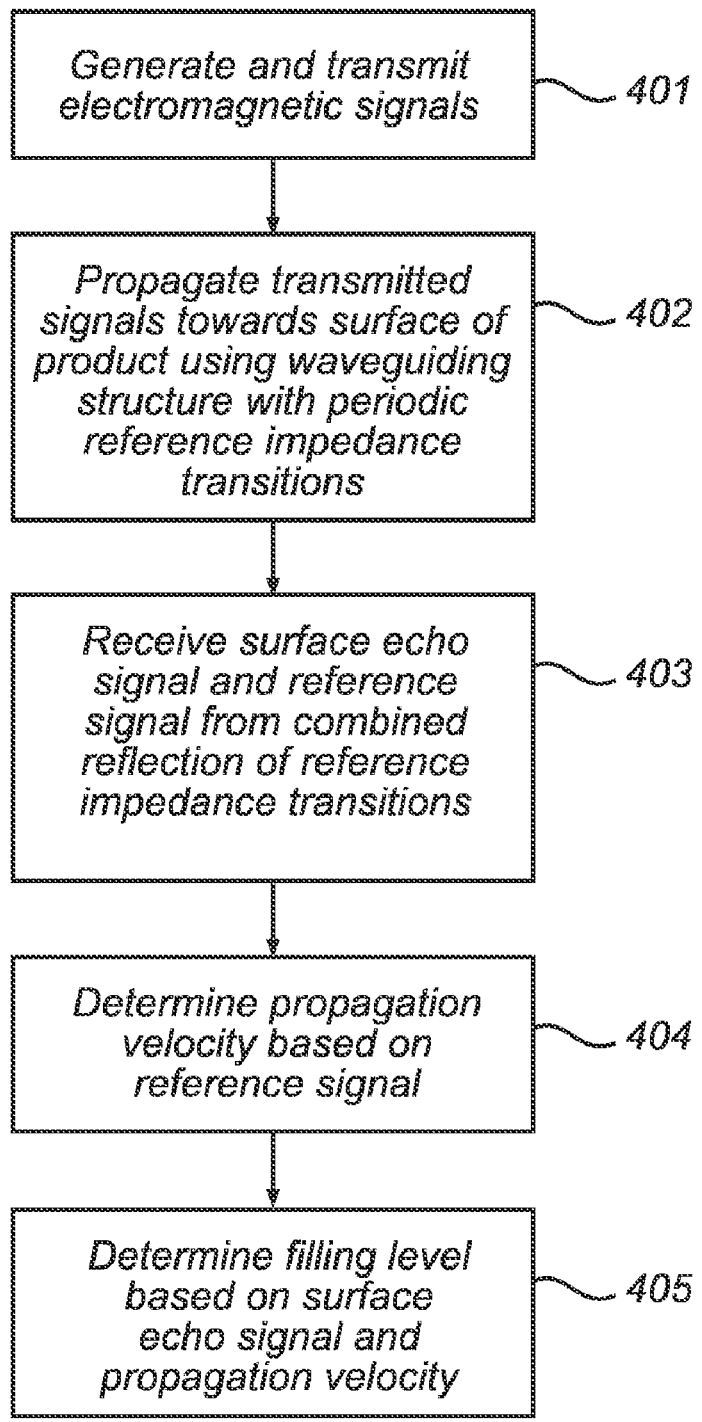
FIG. 4 is a flow-chart schematically illustrating an embodiment of the method according to the present invention.

With reference to the schematic flow-chart in FIG. 4, an embodiment of the method according to the present invention will now be described.

In a first step 401, electromagnetic signals are generated and transmitted by the transceiver 10 comprised in the measurement electronics unit 2 of the radar level gauge system 1. Subsequently, in step 402, transmitted signals are propagated towards the surface 7 of the product 6 contained in the tank 5 using a waveguiding structure 3 provided with periodic reference impedance transitions 25a-b. As has already been described above, the distance between the reference impedance transitions 25a-b has been selected such that the very weak echo signals from each reference impedance transitions combine to form a detectable reference signal within a narrow frequency range. In the next step 403, the reference signal and a surface echo signal resulting from reflection of the transmitted electromagnetic signal $S_T$ at the surface 7 of the product 6 in the tank 5 are received by the transceiver 10. Thereafter, in step 404, the processing circuitry 11 comprised in the radar level gauge system 1 determines the propagation velocity $v_{prop}$ in the medium above the surface of the product (for example the tank atmosphere) using the frequency of the reference signal, and in step 405, the processing circuitry 11 finally determines the filling level of the product 6 in the tank 5 based on the surface echo signal and the propagation velocity $v_{prop}$ determined in step 404.

The person skilled in the art realizes that the present invention by no means is limited to the preferred embodiments described above. For example, the radar level gauge system may be a pulsed system, or the sweep of the exemplified FMCW-system may be configured differently. Moreover, the reference impedance transitions may not necessarily be provided in the form of external structures, but may be provided as internal structures, such as material interfaces or as indentations of recesses.

What is claimed is:

1. A radar level gauge system, for determining a filling level of a product contained in a tank, said radar level gauge system comprising:
    a transceiver for generating, transmitting and receiving electromagnetic signals within a frequency range;
    a waveguiding structure arranged to extend into said product contained in the tank and to guide a transmitted signal from said transceiver towards a surface of said product and to guide echo signals resulting from reflections at impedance transitions encountered by the transmitted electromagnetic signals, including a surface echo signal resulting from reflection at said surface, back to said transceiver;
    a plurality of reference impedance transitions provided substantially periodically along said waveguiding structure with a distance between adjacent reference impedance transitions that is selected such that signals resulting from reflection of said transmitted signal at each of said reference impedance transitions combine to form a reference signal having a frequency within said frequency range; and
    processing circuitry connected to said transceiver for determining a propagation velocity of said electromagnetic signals in a medium inside the tank above said surface of the product based on said frequency of said reference signal and said distance between adjacent reference impedance transitions, and determining said filling level based on said surface echo signal and said propagation velocity.

2. The radar level gauge system according to claim 1, wherein each reference impedance transition is configured to reflect an echo signal having a power that is lower than −20 dB in relation to a power of said transmitted signal.

3. The radar level gauge system according to claim 1, wherein, for each reference impedance transition, said distance between adjacent reference impedance transitions is smaller than 1 meter.

4. The radar level gauge system according to claim 1, wherein, for said plurality of reference impedance transitions, a standard deviation of said distance between adjacent reference impedance transitions is below 1 percent of an average of said distance.

5. The radar level gauge system according to claim 1, wherein at least 10 reference impedance transitions are provided along said waveguiding structure.

6. The radar level gauge system according to claim 1, wherein said waveguiding structure is single line probe.

7. The radar level gauge system according to claim 6, wherein each of said reference impedance transitions is formed by a reflecting structure attached to said single-line probe.

8. The radar level gauge system according to claim 1, wherein said waveguiding structure is a coaxial waveguide having an inner conductor and an outer conductor.

9. The radar level gauge system according to claim 8, wherein each of said reference impedance transitions is formed by a spacing structure arranged to space apart said inner and outer conductors.

10. The radar level gauge system according to claim 1, wherein said waveguiding structure is a twin-line probe comprising a pair of conductors.

11. The radar level gauge system according to claim 10, wherein each of said reference impedance transitions is formed by a spacer element for spacing apart said conductors.

12. The radar level gauge system according to claim 1, wherein said waveguiding structure is a still pipe for guiding signals emitted by an antenna.

13. The radar level gauge system according to claim 12, wherein each of said reference impedance transitions is formed by at least one recess formed in a wall of said still pipe.

14. A waveguiding structure for use in a radar level gauge system for guiding transmitted electromagnetic signals within a frequency range towards and into a material comprised in a tank and for guiding echo signals resulting from reflections at impedance transitions encountered by the transmitted electromagnetic signals back along said waveguiding structure,
    the waveguiding structure comprising a plurality of reference impedance transitions provided substantially periodically along said waveguiding structure with a distance between adjacent reference impedance transitions that is selected such that signals resulting from reflection of a transmitted signal at each of said reference impedance transitions combine to form a reference signal having a frequency within said frequency range,
    thereby enabling determination of a propagation velocity of said electromagnetic signals in a medium inside the tank based on said frequency of said reference signal and said distance between adjacent reference impedance transitions.

15. The waveguiding structure according to claim 14, wherein each reference impedance transition is configured to reflect an echo signal having a power that is lower than −20 dB in relation to a power of said transmitted signal.

16. The waveguiding structure according to claim 14, wherein, for each reference impedance transition, said distance between adjacent reference impedance transitions is smaller than 1 meter.

17. The waveguiding structure according to claim 14, wherein, for said plurality of reference impedance transitions, a standard deviation of said distance between adjacent reference impedance transitions is below 1 percent of an average of said distance.

18. The waveguiding structure according to claim 14, wherein at least 10 reference impedance transitions are provided along said waveguiding structure.

19. The waveguiding structure according to claim 14, wherein said waveguiding structure is single line probe.

20. The waveguiding structure according to claim 19, wherein each of said reference impedance transitions is formed by a reflecting structure attached to said single-line probe.

21. The waveguiding structure according to claim 14, wherein said waveguiding structure is a coaxial waveguide having an inner conductor and an outer conductor.

22. The waveguiding structure according to claim 21, wherein each of said reference impedance transitions is formed by a spacing structure arranged to space apart said inner and outer conductors.

23. The waveguiding structure according to claim 14, wherein said waveguiding structure is a twin-line probe comprising a pair of conductors.

24. The waveguiding structure according to claim 23, wherein each of said reference impedance transitions is formed by a spacer element for spacing apart said conductors.

25. The waveguiding structure according to claim 14, wherein said waveguiding structure is a still pipe for guiding signals emitted by an antenna.

26. The waveguiding structure according to claim 25, wherein each of said reference impedance transitions is formed by at least one recess formed in a wall of said still pipe.

27. A method for determining a filling level of a product contained in a tank, said method comprising:
generating and transmitting electromagnetic signals within a frequency range;
propagating transmitted electromagnetic signals along a waveguiding structure extending towards and into said product contained in the tank, the waveguiding structure comprising a plurality of reference impedance transitions provided substantially periodically along said waveguiding structure with a distance between adjacent reference impedance transitions that is selected such that signals resulting from reflection of a transmitted electromagnetic signal at each of said reference impedance transitions combine to form a reference signal having a frequency within said frequency range;
receiving echo signals resulting from reflections at impedance transitions encountered by said transmitted electromagnetic signals, including said reference signal and a surface echo signal resulting from reflection at said surface of the product;
determining a propagation velocity of said electromagnetic signals in a medium inside the tank above said surface of the product based on said frequency of said reference signal and said distance between adjacent reference impedance transitions; and
determining said filling level based on said surface echo signal and said propagation velocity.

28. The method according to claim 27, wherein generating and transmitting electromagnetic signals comprises:
frequency modulating said electromagnetic signals.

29. The method according to claim 28, wherein frequency modulating said electromagnetic signals comprises:
in a first frequency sweep, sweeping a frequency of said electromagnetic signals across a first frequency range, excluding said frequency of the reference signal, at a first sweep rate; and
in a second frequency sweep, sweeping a frequency of said electromagnetic signals across a second frequency range, including said frequency of the reference signal, at a second sweep rate lower than said first sweep rate.

30. The method according to claim 29, wherein said second sweep rate is lower than 50 percent of said first sweep rate.

31. The method according to claim 29, wherein said second frequency range is smaller than said first frequency range.

32. The method according to claim 31, wherein said second frequency range is smaller than 50 percent of said first frequency range.

33. The method according to claim 29, further comprising
determining intermediate frequency signals by combining said echo signals and a signal indicative of said transmitted electromagnetic signal;
analyzing intermediate frequency signals corresponding to said second frequency sweep to determine said frequency of the reference signal; and
analyzing intermediate frequency signals corresponding to said first frequency sweep to determine a frequency shift indicative of said filling level.

34. The method according to claim 33, wherein:
said intermediate frequency signals corresponding to said second frequency sweep are analyzed in a time domain; and
said intermediate frequency signals corresponding to said first frequency sweep are analyzed in a frequency domain.

* * * * *

UNITED STATES PATENT AND TRADEMARK OFFICE
CERTIFICATE OF CORRECTION

PATENT NO. : 7,586,435 B1  
APPLICATION NO. : 12/122016  
DATED : September 8, 2009  
INVENTOR(S) : Edvardsson Page 1 of 1

It is certified that error appears in the above-identified patent and that said Letters Patent is hereby corrected as shown below:

Title Page, item (73) "Gothenburg (SE)" should be changed to --Goteborg (SE)--

Signed and Sealed this

Sixteenth Day of March, 2010

David J. Kappos  
*Director of the United States Patent and Trademark Office*